(12) United States Patent
Schad et al.

(10) Patent No.: US 7,303,068 B2
(45) Date of Patent: *Dec. 4, 2007

(54) POLYMER GROUT COMPOSITIONS

(75) Inventors: Gregory W. Schad, Cary, IL (US); Vanda I. Wolinsky, Chicago, IL (US); Bronwyn T. Miller, Belvidere, IL (US)

(73) Assignee: Specialty Construction Brando, Inc., St. Paul, MN (US)

( * ) Notice: Subject to any disclaimer, the term of this patent is extended or adjusted under 35 U.S.C. 154(b) by 327 days.

This patent is subject to a terminal disclaimer.

(21) Appl. No.: 10/729,630

(22) Filed: Dec. 5, 2003

(65) Prior Publication Data

US 2005/0124754 A1    Jun. 9, 2005

(51) Int. Cl.
    *B65D 77/00*    (2006.01)
(52) U.S. Cl. .................. 206/81; 206/223; 206/232; 524/35; 524/436; 524/502; 524/506
(58) Field of Classification Search ............... 524/556, 524/588
    See application file for complete search history.

(56) References Cited

U.S. PATENT DOCUMENTS

| | | | |
|---|---|---|---|
| 3,706,696 A | | 12/1972 | Bernett et al. |
| 3,859,233 A | * | 1/1975 | Barker .................. 524/43 |
| 3,967,429 A | | 7/1976 | Weiant et al. |
| 4,287,115 A | * | 9/1981 | Legler .................. 523/443 |
| 5,044,758 A | * | 9/1991 | Kurtz .................... 366/77 |
| 5,336,318 A | | 8/1994 | Attard et al. |
| 5,362,322 A | | 11/1994 | Johansen, Jr. et al. |
| 5,547,504 A | | 8/1996 | Soroushian |
| 5,558,708 A | | 9/1996 | Johansen, Jr. et al. |
| 5,846,315 A | | 12/1998 | Johansen, Jr. et al. |
| 5,855,665 A | | 1/1999 | Johansen, Jr. et al. |
| 5,951,752 A | | 9/1999 | Johansen, Jr. et al. |
| 2002/0020328 A1 | | 2/2002 | Krenz |
| 2002/0065353 A1 | * | 5/2002 | Anderson et al. ........... 524/492 |
| 2002/0144632 A1 | | 10/2002 | Johansen, Jr. et al. |
| 2002/0195025 A1 | | 12/2002 | Bacher et al. |
| 2003/0051639 A1 | | 3/2003 | Dams et al. |
| 2004/0134163 A1 | * | 7/2004 | Rooshenas ............... 52/742.16 |
| 2004/0173640 A1 | * | 9/2004 | Brandon ................. 222/327 |
| 2005/0065256 A1 | | 3/2005 | Kyte et al. |
| 2005/0148726 A1 | | 7/2005 | Coggio et al. |

FOREIGN PATENT DOCUMENTS

| | | |
|---|---|---|
| DE | 37 12 382 | 10/1988 |
| DE | 38 26 877 | 2/1990 |
| EP | 0 857 772 | 9/1998 |
| GB | 975 587 | 11/1964 |
| GB | 1572906 A * | 8/1980 |
| JP | 05209109 A * | 8/1993 |
| WO | WO 01/77242 | 10/2001 |

OTHER PUBLICATIONS 4 pgs. PCT International Search Report PCT/US2004/040325, mailed May 2, 2005.
Now Tintable NCB, product literature, Dryvit Systems, Inc. (4 pages).
Q-Set, Multi Mastic Ceramic Tile Adhesive, Gel, Type 1, product literature, Q.E.P. Co., Inc. (3 pages).

* cited by examiner

*Primary Examiner*—Marc S. Zimmer

(57) ABSTRACT

The present invention relates to a one-part polymer grout composition tintable to any desired color upon request, as well as to a method of tinting the grout composition. Advantageously, the present one-part polymer grout compositions may be tinted using any of the multiplicity of commercially available universal colorants, according to fandecks of color based upon the same, or by visual or computerized color matching. Similarly, since conventional universal colorants may be employed, the equipment utilized to tint and agitate paint in order to provide any desired color may be utilized to tint the present grout compositions. A kit is also provided, comprising the tintable grout composition and instructions for tinting the grout composition according to the method.

14 Claims, No Drawings

US 7,303,068 B2

POLYMER GROUT COMPOSITIONS

FIELD OF THE INVENTION

The present invention relates to novel shrink and/or crack resistant one-part polymer grout compositions that are tintable at a point of sale. More particularly, and due at least in part to the inclusion of one or more fiber fillers, rheology modifying agents, dispersants and/or surfactants, the present grout compositions may be provided to a retailer in any number of tintable base formulations, that may then be tinted to a virtually infinite number of colors via standard paint tinting equipment. This combination of properties renders the present grout compositions suitable for use in a wider variety of applications than conventional one-part polymer grouts.

BACKGROUND OF THE INVENTION

The construction industry has shown incredible resilience, if not dynamic growth at times, for the past decade. As the industry has grown, so has the demand for a greater variety and improved quality of construction products and materials. Further, as more and more relatively untrained individuals, as opposed to trained or licensed professionals, are willing to attempt certain building, remodeling or improvement tasks, the demand for greater accessibility to, and enhanced convenience of using, such a variety and quality of products and materials has also increased.

Due at least in part to the to the typically manageable size of such projects, and the labor related cost savings that may be realized, tile installation projects are but one example of a construction project that many individuals are willing to attempt with little or no experience or training. While certainly not simple, the average tile project can be completed in a matter of days. Further, the tools and supplies required to do so are readily available for purchase, and in fact, oftentimes many alternatives are available. For example, there are at least 4 different types of grout to choose from in order to fill the joints between placed tiles, i.e., cement grout, polymer modified cement grout, two part polymer grout, and one part polymer grout.

Although each of these may be suitable or desirable depending upon e.g., the particular application and the installer's preference, one part polymer grout is the only one that offers the convenience of being available in a pre-mixed state. That is, and whereas one part polymer grout hardens, and perhaps cross links to some extent, merely upon drying, the other grouts cure or harden upon the addition of water, or in the instance of two part polymer grout, upon the combination of the two parts. As such, these grouts must be mixed at the time of use and once mixed must be used quickly prior to their hardening to such an extent as to become unusable.

Although one-part polymer grouts thus provide a significant convenience to tile installers, those currently in the marketplace are not optimal for all applications. As but one example, currently commercially available one-part polymer grouts are only available in a limited amount of pre-mixed colors (typically white, black and shades of brown and gray), thus limiting their use to those projects where these colors will coordinate. Many of these one-part polymer grouts are also not sufficiently strong, shrinkage and/or crack resistant in order to be suitable for use in many environments. Finally, and due at least in part to the fact that these grouts harden though moisture loss, conventional one-part polymer grouts can be susceptible to shrinkage or cracking, especially when utilized with tile that absorbs substantial amounts of water itself, such as clay-bodied tile.

The convenience of use of one-part polymer grouts could thus be enhanced if such pre-mixed grouts were available in a wider variety of colors. One-part polymer grouts could further be improved if they were suitable for use in a wider variety of applications than currently available one-part polymer grouts.

SUMMARY OF THE INVENTION

The present invention relates to novel one-part polymer grout compositions that may be tintable to any of a wide spectrum of colors with conventional paint tinting systems, comprising e.g., color decks, tint agents, tinting equipment and shakers, common in many hardware and home improvement stores. As such, the convenience and applicability of the present grout compositions can be significantly enhanced relative to conventional one-part polymer grouts. The present grout compositions may also be substantially shrinkage and/or crack resistant, so as to be suitable for use in joint spaces up to ¼" wide. In some embodiments, the grout compositions can also be water and/or stain resistant, further enhancing the convenience of the present grout compositions.

In a first aspect, then, the present invention provides a one-part polymer grout composition tintable upon request to provide a stable, uniformly tinted, grout composition. More particularly, the present grout compositions may be tinted using any of a number of commercially available universal colorants or tints uniformly, i.e., to a color dispersion of less than at least about 0.5. Further, once so tinted, the tint is stable within the grout composition when subjected to accelerated aging conditions, i.e. oven storage at 50° C. for a period of at least about 14 days, or about 28 days, or even about 6 weeks. It has now been discovered that grout compositions can be so tinted, conveniently and advantageously using commonplace equipment for tinting and mixing paint and stain to custom colors, via the inclusion therein of at least two fiber fillers. While not wishing to be bound by any theory, it is believed that the fiber fillers can act as shear thinning agents when the grout composition is agitated to assist in the dispersion of the tint there through. It is further believed that the fiber fillers can also act as agitation facilitators, by enhancing the agitation of the grout via the movement imparted to the fibers upon shaking.

The ability to provide one-part polymer grout compositions on demand according to any desired color represents a significant advance inasmuch not only due to the previously unrealized convenience that this represents, but also because a much wider variety of colors can be provided than have been commercially provided in the past. That is, and although colored one-part polymer grout compositions have been commercially available for some time, the available colors are extremely limited, often being limited to brown, gray or black. The present inventive grouts can be custom colored to any of a virtually infinite number of colors, according to the consumer's needs or preference.

In a second aspect then, the present invention also provides a method of providing a tinted one-part polymer grout composition upon request. More specifically, the method comprises providing a one-part polymer grout, adding one or more universal colorants to the grout composition capable of providing the tinted grout requested, and agitating the grout composition to provide the requested tinted grout composition. The universal colorants to be used to provide the requested color can be determined via visual color matching, computerized color matching, or in the instance wherein the requested color is commercially available from a fandeck of color formulations, may simply be determined by reference to the formula associated with the color.

Due to the convenience provided by the same, the provision of a fandeck of colors is contemplated. That is, and although many talented paint matching and mixing professionals exist who are capable of providing visual color matching with minimal trial and error, these professionals may not be present in every desired retail outlet for present grout compositions. Further, not every outlet may have computerized color matching equipment.

As such, the present invention also contemplates a kit comprising a tintable one-part grout composition as well as instructions for adding one or more universal colorants to the tintable grout composition to provide a tinted grout composition. The instructions, e.g., may be in the form of at least one fandeck of color formulations based upon universal colorants. In certain embodiments, the universal colorants upon which the at least one fandeck is based may be provided. Alternatively, fandecks based upon a plurality of colorants may be provided, so that no matter what colorant system may be available in any given outlet, a consumer may take advantage of the convenience afforded by the kit embodying features of the present invention.

DETAILED DESCRIPTION OF EMBODIMENTS OF THE INVENTION

The embodiments of the present invention described below are not intended to be exhaustive or to limit the invention to the particular embodiments disclosed in the following detailed description. Rather, the embodiments are described so that others skilled in the art can understand the principles and practices of the present invention.

Unless noted otherwise, the following terms and/or phrases, as used herein, have the following meanings. Such terms/phrases may be explained in greater detail later in the specification. The term "grout" is meant to indicate a composition, whether sanded or unsanded, suitable for filling joint spaces between tiles in vertical or horizontal applications, and thus, generally speaking, having a viscosity of at least about 100,000 cps or about 600,000 cps, or even 1,000,000 cps. In order to be suitable for such a use, and thus, within the scope of this term as used herein, grout compositions are also desirably readily removable from a tile surface once applied and dried. For some grout compositions this may indicate that a minimum film formation temperature of at least about 20° F., or a $T_g$ greater than about 30° F. may be required. The phrase "one-part polymer composition" is meant to indicate a grout composition that hardens, or 'cures', via the evaporation of water, rather than via a chemical reaction between two parts, whether or not one of the two parts is water, as is the case with, e.g., cement. The phrases "sanded grout" and "unsanded grout" are meant to indicate grout compositions that include an amount of sand as a filler, or don't include such an amount, respectively.

The term "tintable" is meant to indicate the capability of being stably and uniformly tinted using universal colorants, tints or pigments. A grout composition is deemed to be uniformly tinted if it attains a color dispersion measurement value of 1.5 or less, 1.0 or less, or even less than 0.5 and is considered stable if the colorant remains substantially dispersed in the grout composition for a period of at least about 14 days, or at least 28 days, or even at least about 6 weeks when the grout composition is subjected to oven accelerated aging at 50° C. The phrases "shrink resistant" or "crack resistant" are meant to indicate that no cracking or sinking of the grout composition, visible upon inspection with the naked eye, is seen once a 12"×16" tile installation, with 3/16" minimum grout joints for sanded grout, and an 8"×8" tile installation, with 1/16" minimum grout joints for unsanded grout, has been installed and allowed to dry. The phrase "water-resistant" is meant to indicate a grout composition that meets or exceeds the requirement for standard cement grout provided in American National Standard Specifications ANSI A 118.6 and 118.7, as measured by the method also provided therein. In certain advantageous embodiments, a water-resistant grout composition may advantageously maintain a Shore A hardness value of at least about 50, or 60, or even 75 after being submerged in water for a period of seven days. The phrase "stain resistant" is meant to indicate an averaged score of from about 0 to about 2 as measured according to Ceramic Tile Institute Stain Test CTE-T-72. The phrase "silanated" is meant to indicate that at least one silane group ($SiR_3$) wherein R can be any alkyl or cycloalkyl group and desirable may be e.g. a methyl, ethyl, propyl, or butyl group has been chemically linked to at least one monomeric unit of a polymer. The phrase "weight percent", and the abbreviation thereof "wt %", are meant to indicate weight percent as based upon the total weight of the grout composition.

The present invention relates to novel one-part grout compositions that are tintable upon request to any desired color using universal colorants as potentially may be facilitated by the ability to utilize tinting and mixing equipment commonly used to tint paint or stain. As such, and in contrast to conventional one-part polymer grout compositions, the present grout compositions can be any desired color as may be selected by a consumer from a virtually infinite array of choices. The grout compositions may also advantageously be substantially shrinkage and/or crack resistant further enhancing their applicability to any desired tile application. That is, whereas conventional one-part polymer grout compositions may tend to shrink and/or crack when used with tiles made from water absorbing materials, the present grout compositions are expected to be useable with tiles made from any material, with substantially no shrinking or cracking.

In certain embodiments, the grout compositions may also be surprisingly strong, as well as being substantially water and/or stain resistant. In fact, the present one-part polymer grout compositions can meet or exceed the strength, water and stain resistance requirements, and further can even achieve a residential installation rating, according to the industry standards for cement grout. As a result, the present grout compositions may be utilized in applications wherein the use of conventional one-part polymer grouts had previously been contraindicated.

The present invention thus provides a one-part polymer grout composition that is tintable upon request to provide any desired color. More particularly, the present grout compositions can be tinted with such commercially available colorants, and if desired, equipment, to grout compositions that are substantially uniformly tinted not only to the naked eye, but also when measured using a Spectraflash® 600 Plus (Datacolor International) spectrophotometer. More particularly, the present grout compositions are capable of being tinted to a color dispersion of less than at least about 1.5, or even less than about 1.0, or even less than about 0.5. Further, the present grout compositions are stable when so tinted, i.e., the tint pigment or agent remains substantially dispersed within the grout composition, with no visible separation thereof for at least about 14 days, or at least about 28 days, or even for at least about six weeks, when subjected to heat accelerated shelf stability studies. Significantly, six weeks of accelerated aging is considered to be representative of at least a one-year shelf life at normal, ambient storage conditions.

It has now been discovered that grout compositions may be rendered so tintable via the inclusion of one or more fiber fillers, either alone, or in combination with one or more rheology modifiers, surfactants and/or dispersants. While not wishing to be bound by any theory, it is believed that the inclusion of sufficient amounts of fiber fillers can sufficiently assist in the dispersion of tinting agents throughout the present grout compositions to provide the desired uniformity and stability by acting as rheology modifiers, i.e., by causing a reduction in the viscosity of the grout compositions when shaken, or otherwise agitated, in a paint mixer, and that this reduction in viscosity may facilitate the uniform dispersion of tint throughout the grout composition. The fiber fillers may also act as mixing facilitators, i.e., by enhancing the shaking or agitation action within the grout composition via the motion imparted to the fibers via the shaking or agitation of the grout composition.

Advantageously, the fiber filler(s) can further provide the grout composition, once applied and dried, with shrinkage and/or crack resistance. That is, and inasmuch as one-part polymer compositions harden simply by the evaporation of water, or other solvents, they can be prone to shrinkage or cracking. The inclusion of fiber fillers can act to provide an interlocking network that can, in turn, increase the cohesiveness of the grout compositions upon drying so that substantial shrinking or cracking is not seen. As a result, the present grout compositions can be even more suitable for use in larger joint spaces. Additionally, enhancements to shrinkage and crack resistance can render the present grout compositions even more suitable for use with tiles comprising water absorbing materials, such as clay-based materials, and certainly more suitable for such uses than conventional one-part polymer grouts.

Fiber fillers comprising any material are believed to be capable of providing at least some rheology modification and/or mixing facilitation, and many types of fiber fillers are known and commercially available. Mineral fillers, for example, are commercially available under the trade designations Nyad® G or Wollastocoat® (Nyco, Calgary, Alberta, Canada) or MS605 Roxul 1000 (Lapinus Fibres BV, Roermond, Netherlands), while one example of a commercially available cellulose fiber filler is that having the trade name Arbocel® (all grades) from J. Rettenmaier USA, Schoolcraft, Mich. Any of these, or any other commercially available fiber filler comprising any material, may be utilized alone or in combination in the present grout compositions.

As is recognized by those of ordinary skill in the art, the amount of any such fiber filler(s) utilized will depend at least in part on the particular fiber filler chosen. Of course, the total amount of fiber filler utilized will desirably be enough to at least minimally assist in tint dispersion throughout the grout compositions, but yet not so much as to detrimentally impact any other desirable properties thereof. Generally speaking, amounts of mineral fibers, when used alone, ranging from about 0.1 to about 20 wt %, or from about 1 wt % to about 10 wt %, or even from about 2 wt % to about 6 wt % can provide the desired rheology modification or other assistance in tint dispersion. Cellulose fibers in amounts ranging from about 0.05 wt % to about 2 wt %, or 0.1 wt % to about 1 wt %, or from about 0.2 wt % to about 0.9 wt % are believed to be capable of providing minimal improvement in tint dispersion in the present grout compositions. Combinations of fillers comprising a variety of materials may be used, and if the same is desired, each type of fiber may be included in the combination in an amount according to the ranges provided herein.

Although expected to be uniformly tintable via the inclusion of one or more fiber fillers, the tintability of the grout compositions may be further enhanced via the inclusion therein of one or more rheology modifiers, surfactants and/or dispersants. Many rheology modifiers are known and commercially available and any of these may be used in the present grout compositions. For example, "Rheology Modifiers Handbook: Practical Use and Application", David R. Braun and Meyer R. Rosen, William Andrews Publishing, New York, N.Y., 2001, describes many commercially available rheology modifiers, as well as selection procedures and formulations thereof, and is hereby incorporated by reference herein in its entirety for all purposes. Generally, rheology modifiers may be comprised of acrylic polymers; cross-linked acrylic polymers; alginates; associative thickeners; carrageenan; cellulose derivatives, including, but not limited to, microcrystalline cellulose, carboxymethylcellulose sodium, hydroxyethylcellulose, hydroxypropylcellulose, and methylcellulose; guar and guar derivatives; locust bean gum; organoclays and other clays; polyethylene oxide; polyethylene; polyvinyl pyrrolidone silica; xanthan gum; or combinations of these.

But a few examples of commercially available rheology modifiers that may be suitable for use in the present grout compositions include any or all of the grades available under the trade names Carbopol® (Noveon Inc., Cleveland, Ohio); Cab-O-Sil® (all grades, Cabot Corp., Tuscola, Ill.); Aerosil® (all grades, Degussa, Piscataway, N.J.); Bermocoll® (all FQ grades, Akzo Nobel Stenungsund, Sweden); Cellosize® (all Q grades, The Dow Chemical Co., Midland, Mich.); Tylose® (all grades, Clariant Corp., Charolette, N.C.); Acrysol® (all grades, Rohm & Haas, Philadelphia, Pa.) and Attagel® (all grades Engelhard, Iselin, N.J.).

Amounts of the rheology modifiers will depend not only on the particular rheology modifier used, but also on the desired effect of the same. That is, while rheology modifiers may surprisingly result in the present grout compositions being tintable at a point of sale, this may not be desired or required in all instances. Bearing this is mind, in those embodiments where the addition of rheology modifiers results in a grout composition according to the present invention being tintable at a point of sale, the amount of rheology modifiers included will desirably be capable of providing a reduction in viscosity of at least about 35%, or about 40%, or even at least about 50%, so that the tinting agent may be uniformly dispersed within the grout composition. For any other purpose, very generally speaking then, polymeric and cellulosic rheology modifiers may generally be included in the present grout compositions in amounts ranging from about 0.05 to about 2 weight percent, in some embodiments from about 0.1 to about 1.5 wt % and in yet other embodiments, from about 0.2 wt % to about 1 wt %, based upon the total weight of the grout composition, while fumed silica and clay rheology modifiers may suitable be included in the grout compositions in amounts ranging from about 0.05 wt % to about 5 wt %, in some embodiments from about 0.1 wt % to about 4 wt %, and in yet other embodiments from about 0.5 wt % to about 3 wt %.

One or more surfactants and/or dispersants may also desirably be included in the present grout compositions as may be desired to assist not only in the uniform dispersion of the tint throughout the grout composition upon shaking, but also to assist in the stability of the tint within the grout composition once so uniformly dispersed. Many dispersants and surfactants suitable for use in conventional compositions are known and any of these may be used in the present tintable grout compositions. A few examples of commercially available dispersants include those provided under the trade designations Colloid 211 (Rhodia USA, Cranbury, N.J.), Sokalan® CP13S (BASF Inc. Charlotte, N.C.) and Tamol® 731 (Rohm & Haas), while examples of commercially available surfactants include, but are not limited to, those provided under the trade designations T-Det® N407 and Triton® X100 (Harcros Chemicals, Inc., Kansas City, Kans. and Rohm and Haas, respectively)

As is understood by those of ordinary skill in the art, the amount of surfactant and/or dispersant utilized will depend upon the particular surfactant and/or dispersant selected. Desirably, the amounts utilized will at least minimally assist in the uniform dispersion of a tint within the grout composition, as well as the stability of the tint within the grout composition once so dispersed, but not so much as to substantially detrimentally impact other desirable properties of the grout compositions. Bearing these considerations in mind, and very generally speaking, useful amounts of dispersants are expected to range from about 0.1 wt % to about 3 wt %, or from about 0.2 wt % to about 2 wt %, or even from about 0.5 wt % to about 1.5 wt %. Similarly, useful amounts of surfactants are expected to range from about 0.2 wt % to about 2 wt %, or from about 0.4 wt % to about 1.5 wt % or even from about 0.5 wt % to about 1 wt %.

Due to the ability to tint the present grout compositions using common, commercially available paint tint agents and paint tinting and mixing equipment, and even further in light of the enhanced shrinkage and/or crack resistance exhibited by the same, the present one-part polymer grout compositions dramatically increase the currently limited applicability of one-part polymer grout compositions while yet maintaining the convenience provided by the one-part, no mixing required, system. The present invention yet contemplates and provides embodiments wherein certain properties of the grout compositions may be even further enhanced. In particular, in certain embodiments, the present grout compositions can be provided to be surprisingly strong, as well as being substantially water and/or stain resistant. As a result, the present grout compositions may be utilized in applications wherein the use of conventional one-part polymer grouts had previously been contraindicated.

Such advantageous properties may surprisingly be provided to the present grout compositions via inclusion therein of a silanated polymer, as described in commonly assigned co-pending patent application Ser. No. 10/729116, filed on Dec. 5, 2003, incorporated by reference herein in its entirety and for all purposes. Any silanated polymer, or dispersion or combination comprising the same, is believed to be capable of providing the present grout compositions with the surprising strength, water and stain resistance described herein.

One example of a particular class of polymers that may advantageously be employed in this embodiment of the present invention are acrylics and acrylic dispersions, since acrylic latexes/dispersions can tend to be stronger and more water resistant than other types of polymers. Additionally, many silanated acrylic latexes are readily commercially available, such as those commercially available under the trade designations Rhoximat® DS931 (Rhodia North America Cranbury, N.J.) NX2835 (BASF Inc., Charlotte, N.C.), 13057 (Scott Bader, Northamptonshire, England). Of course, these embodiments of the invention are not so limited, as any known polymer having monomeric units comprising functionality reactive with a silane moiety, $SiR_3$, may be modified to be silanated and then polymerized, according to any methodology known to those of ordinary skill in the art, to provide a silanated polymer in accordance with the present invention.

Those of ordinary skill in the art will be readily capable of determining the appropriate amount of a silanated polymer to include in the present grout compositions, when desired, and of course, the particular amount utilized will depend upon the particular silanated polymer chosen. In any case, enough of the silanated polymer is desirably included so that at least a minimal improvement in strength, water and stain resistance can be seen in the resulting grout compositions, but not so much as to detrimentally impact any other desirable properties or characteristics thereof. In light of these considerations, and very generally speaking, silanated polymers, e.g. silanated acrylic latexes, are desirably included in the present grout compositions in total amounts ranging from about 8 wt % to about 40 wt %, or from about 10 wt % to about 30 wt %, and in certain embodiments, from about 10 wt % to about 20 wt %.

In addition to the silanated polymer, the present grout compositions may further comprise an amount of an acrylic dispersion, such as an acrylic/poly urethane dispersion. The inclusion of such a dispersion can further enhance the water and/or stain resistance of the grout compositions as may be desirable in extremely wet applications. Preferably, if such a dispersion is to be utilized, it will be stabilized hybrid dispersion with enhanced interaction between the urethane and acrylic moieties, rather than a simple blend. Many such stabilized hybrid dispersions are commercially available, with but a few examples of these being any of those available under the trade designations Hybridur® (Air Products and Chemicals Inc., Allentown, Pa.) or NeoPac® (grades E125 and E114, NeoResins, Wilmington, Mass.) If desirably included in the present grout compositions, the dispersions are suitably utilized in amounts ranging from about 1 wt % to about 15 wt %, or from about 2 wt % to about 10 wt %, or even from about 3 wt % to about 5 wt %.

As discussed above, in those embodiments of the present invention wherein the grout compositions comprise a silanated polymer, the grout compositions may exhibit surprising strength, e.g., the grout composition may be capable of meeting, or even exceeding the standards for flexural and tensile strength provided by the American National Standard Specifications for standard cement grouts, as well as achieving a residential installation rating under ASTM C627-76. These embodiments of the present grout compositions are yet also surprisingly water and stain resistant, capable of meeting or even exceeding these standards for cement grouts provided by the American National Standard Specifications.

However, and although the grout compositions are believed to be substantially water and/or stain resistant merely due to the inclusion therein of a silanated polymer, the stain resistance of the present grout compositions may also be further enhanced. In applications where such enhancement in the properties is desired, e.g. as may be the case for extremely wet application sites, in application sites where mold and mildew are otherwise known to proliferate, or application sites where contact with stain causing agents may be anticipated, the present grout compositions may further comprise effective amounts of anti-microbial and/or stain resistance additives. The commercial market is replete with such agents, and any of these may be used to further optimize the stain resistance of the present grout compositions.

Zinc oxide is one example of a generic antimicrobial agent available from any of a number of sources, while other examples of antimicrobial agents include barium metaborate (Revelli, Chemicals, Inc., Greenwich, Conn.), Kathon® LX (Rohm & Haas, Philadelphia, Pa.) zinc omadine and sodium omadine (Arch Chemicals, Inc, Norwalk Conn.) trichlosan (Ciba Specialty Chemicals, Basel Switzerland) or Troysan® 174 and Troysan® P2OT (Troy Corporation, Florham Park, N.J.). Suitable amounts of these will vary according to the particular antimicrobial agent chosen, but in each instance, suitable amounts are well known to those of ordinary skill in the art, and further may be available from the respective suppliers of each. Generally speaking then, zinc oxide and barium metaborate may be included in the present grout compositions in amounts ranging from about 1 wt % to about 20 wt %, from about 3 wt % to about 15 wt % or even from about 5 wt % to about 10 wt %, while zinc and sodium omadine and trichlosan may be included, if desired, in amounts ranging from about 0.05 wt % to about 5 wt %, from about 0.1 wt % to about 4 wt % or from about 0.15 wt % to about 1 wt %.

Commercially available stain resistance additives include, but are not limited to, Teflon powders, such as Zonyl® MP1200 from DuPont; silicone/silane/siloxane emulsions including BS45 or BS1306 from Wacker Silicones, Adrian, Mich.; fluoropolymers emulsions like APG3312 from Advanced Polymer, Inc., Carlstadt, N.J.; fluorinated silicone emulsions such as Visil FSE from Vitech International Inc., Janesville, Wis.; wax dispersions such as Aquabead® 325E from Micro Powders, Tarrytown, N.Y.; and polyurethane dispersions such as NeoResR9649 or 9699 also from Neoresins. Useful amounts of each of these stain resistance additives are well known and/or readily available, and generally speaking can range from about 0.5 wt % to about 10 wt %, about 1 wt % to about 6 wt %, or from about 1.5 wt % to about 4 wt % for the Teflon powders and wax dispersions. Silicone/silane/siloxane emulsions, fluoropolymer emulsions and fluorinated silicone emulsions may be utilized, when desired, in amounts ranging from about 1 wt % to about 20 wt %, or from about 2 wt % to about 15 wt % or even from about 3 wt % to about 10 wt %. The acrylic/polyurethane dispersions can be provided in amounts ranging from about 1 wt % to about 15 wt %, from about 2 wt % to about 10 wt %, or from about 3 wt % to about 5 wt %. Finally, suitable amounts of polyurethane dispersions can range from about 0.5 wt % to about 6 wt %, from 0.6 wt % to about 4 wt %, 0.8 wt % to about 1.5 wt %.

The present grout composition may further comprise any of the components otherwise found in conventional one-part polymer grout compositions. In addition to the fiber fillers, either alone or in combination with rheology modifies, surfactants and/or dispersants to render the grout compositions tintable or to enhance the tintability of the grout compositions, respectively, the silanated polymer as may be provided to render the present grout compositions exceptionally strong, as well as water and/or stain resistant additives or antimicrobial agents as may optionally be provided to enhance stain resistance, the present grout compositions may include such conventional components as other fillers, solvents, humectants, plasticizers, preservatives, defoamers, adhesions promoters, pH modifiers, freeze-thaw stabilizers, anti-settling agents, etc. If desirably included, each of these may advantageously be utilized in amounts typically utilized in conventional one-part polymer grout compositions, as may be readily determined by those of ordinary skill in the art and/or as may be provided by the supplier of each.

Other fillers, in addition to the fiber fillers and optionally other rheology modifiers, may optionally be utilized in the present grout compositions to, e.g., impart desired application characteristics. Those of ordinary skill in the art are familiar with such fillers, commercial sources of the same, and amounts in which to use them to achieve whatever their desired effect. Glass bubbles, for example, may be included to increase coverage abilities to the present grout compositions and are commercially available under the trade names Scotchlite® and Q-cell® (all grades of each, from 3M, Maplewood, Minn. and PQ Corporation, Valley Forge, Pa., respectively). Ceramic microspheres may be included in the present grout composition for similar purposes and trade names of a few commercially available examples of the same include Fillite®500 (Trelleborg Fillite, Ltd., Norcross, Ga.), Zeospheres G600 (3M) and Extendospheres™ SG, (PQ Corporation). Silica sand is a common filler that may also be utilized to alter the application characteristics of the grout compositions, to assist in tint dispersion, and/or to improve the strength of the grout compositions, when desired. All fine or medium grades commercially available from Fairmont Minerals, Wedron, Ill. and U.S. Silica, Ottawa, Ill. are suitable for such purposes. Finally, calcium carbonate may desirably be added as a fine filler in the grout compositions, and is particularly useful in those instances wherein the present water, stain and crack resistant grout compositions are desirably also tintable. Calcium carbonate is available generically from a number of chemical manufactures.

As mentioned above, those of ordinary skill in the art are well aware, and/or well equipped to calculate, suitable amounts of such fillers. Generally speaking then, glass bubbles and ceramic microspheres may be included in the present grout compositions, if desired, in amounts ranging from about 0.5 wt % to about 10 wt %, in certain embodiments from about 1 wt % to about 8 wt %, and in yet other embodiments from about 2 wt % to about 6 wt %. Silica may be utilized, if desired, in the present grout compositions in amounts from about 20 wt % to about 60 wt %, in other embodiments, about 25 wt % to about 50 wt %, and in yet other embodiments, from about 30 wt % to about 45 wt %. Finally, in those embodiments of the grout compositions wherein it may be desirable to include calcium carbonate, suitable amounts can range from about 5 wt % to about 50 wt %, in other embodiments from about 10 wt % to about 40 wt %, and in yet other embodiments from about 15 wt % to about 30 wt %.

Solvents may also be optionally included in the present grout compositions, as may be required or desired to provide improved application characteristics and/or to further improve crack and/or shrinkage resistance. Solvents useful in one-part polymer grout compositions are well-known, and include water, mineral spirits (generically available from many sources) and other organic solvents. Two commercially available examples of suitable solvents include Texanol® and butyl cellosolv (Eastman Chemical Company, Kingsport, Tenn., and The Dow Chemical Company, respectively). Any solvents desired will be used in any amount required to achieve the desired effect as may be readily determined by those of ordinary skill in the art. The exemplary solvents are expected to be suitable in amounts ranging from about 0.1 wt % to about 5 wt %, or from about 0.5 wt % to about 3 wt %, or even from about 1 wt % to about 2 wt %.

Likewise, humectants and plasticizers are well known to those of ordinary skill in the art, and may be utilized in the present grout compositions as appropriate or desired. Many humectants and plasticizers are known and are commercially available generically. For example, neopentyl glycol and urea are two well known humectants, widely commercially available from a variety of sources, while Benzoflex® 50 (Velsicol Chemical Company, Rosemount, Ill.) is but one example of a plasticizer suitable from use in the present grout compositions, if desired. Suitable amounts, as well known to those or ordinary skill in the art, of these will of course depend upon the particular humectant or plasticizer chosen, but generally speaking, will range from about 0.1 wt % to about 3 wt %, or from about 0.2 wt % to about 2 wt %, or even from about 0.5 to about 1.5 wt %.

The present tintable grout compositions may be prepared according to any known method of preparing one-part polymer grout compositions systems, and the particular methodology employed is not critical. For example, the desired components may simply be placed in an appropriate container in appropriate amounts and mixed until a substantially uniform grout composition is achieved. Particular non-limiting examples of sanded grout compositions embodying features of the present invention, as well as the methods of preparing the same, are provided below at Examples 1 and 2, while one exemplary embodiment of an unsanded grout composition in accordance with the present invention and method of its preparation is provided at Example 3.

Advantageously, and as discussed at length herein, the present grout compositions are tintable to any desired color, from a virtually infinite number of choices, to match any desired application site, in the same fashion as paint or stain. Inasmuch as conventional one-part grout compositions are commercially available in only a very limited array of colors, the tintability of the present grout compositions to a much wider variety of colors represents a significant advantage to users of the same. Further, the grout compositions are so tintable upon request, i.e., the consumers of such grout compositions may tint the grout compositions themselves using commercially available tinting equipment, the operation of which is well known and understood by those of ordinary skill in the art, or by purchasing the present grout compositions from, or providing the grout composition to, any retail outlet having such tinting equipment.

The present invention thus also provides a method of providing a tinted grout composition upon request, comprising providing a one-part polymer grout composition, adding one or more universal colorants to the grout composition capable of providing the requested color, and agitating the grout composition to provide a tinted grout composition as requested. It has now been discovered that providing one-part polymer grout compositions with one or more fiber fillers, rheology modifiers, surfactants and/or dispersants, that the grout compositions can be uniformly and stably tinted with universal colorants currently provided for use in paint or stain. Many such universal colorants (also called tints, tinting agents, pigments, colorants, machine colorants, etc) are known and commercially available and are combinable to provide a virtually infinite array of colors.

Suppliers of such colorants may simply offer a collection of colorants, typically under a tradename, that may be combined in any combination to provide any desired color, i.e., as by computerized colormatching. Alternatively, or additionally, suppliers of such colorants may also offer formulations in combination with their colorants that may be used to achieve a particular collection of colors, often called "fandecks" of color. The same supplier may further offer multiple lines of the same fandeck of color, in different compositions suitable for use to tint a variety of substrates, e.g., water-based or oil based paints or stains, or adapted to a particular customers needs. For example, Degussa Corporation (Parsippany, N.J.) commercializes a collection of pigments and/or pigment compositions under the tradename Colortrend®, as well as several fandecks of colors that may be prepared using these pigments, including, for example, Colortrend Nuance®, Colortrend Ambience® and Colortrend Folio®. Further, Degussa also provides a line under the tradename Aquatrend® that utilizes the Colortrend pigments, but is typically provided to industrial suppliers, so that paint matching for in-plant paint mixing and in-store paint mixing may be achieved.

Any commercially available universal colorants suitable for use with paint or stain may be utilized to provide the present on-demand tinted grout compositions. Desirably, the colorants will be suitable for use in water-based systems, as may or may not be provided in a distinct formulation from those suitable for use in oil-based formulations by the supplier of the colorant. Further, the colorants may be provided as is, so as to be utilized at a mixing or retail facility by colormatching, whether done visually or by computer, or may be provided along with a fandeck of color formulations. There are literally hundreds of suppliers of such colorants around the world and it is to be understood that any of the colorants, suitable for use in a water based system, from any supplier, are suitable for use to provide the on-demand tinted grout compositions according to the present invention. But a few examples of other colorants include, but are not limited to, those commercially available under the tradenames Tint-Ayd® UL (Whittaker, Clark & Daniels, South Plainfield, N.J.) Aquatone® and Sunsperse® (SunChemical Corporation, Fort Lee, N.J.) and Hostatint (Clariant Pigments and Additives, Coventry, R.I.) as well as any of those commercially available from Behr (Santa Ana, Calif.), BASF, Bayer (Leverkusen, Germany) and the like.

If not provided in conjunction with a fandeck, the desired colorant line can have the requested color formulated therefrom via visual or computerized colormatching. Visual colormatching, as many of ordinary skill in the art are aware, can be done simply by adding one or more colorants to achieve the desired color, based upon the expertise and knowledge of the colormatcher. Additional colorants may be added in order to arrive at the requested color, at which time the tint formula employed to do so would be provided to the requester of the tinted grout composition so that further amounts could be purchased in the future, if desired.

More commonly, color matching may be computerized, e.g., a sample of the color will be analyzed by a spectrometer. Software provided in connection with the spectrometer will then calculate a formulation of one or more colorants that will provide the requested color. Many computerized color matching systems are commercially available, and any of these may be utilized in order to provide the requested tinted grout composition. Examples of a few such colormatching systems include, but are not limited to, those available under the tradenames Spectraflash® (Datacolor International, Lawrenceville, N.J.); Coloreye (GretagMacbeth, New Windsor, N.J.); Colorquest® (HunterLab, Reston, Va.), as well as many systems commercially available from Minolta (operting with Spectramatch Software, Ramsey, N.J.) and X-Rite (operated via proprietary Color Master software, Grandville, Mich.).

Once the appropriate combination of colorants has been determined in order to provide the requested color, as may occur via visual colormatching, computerized colormatching or the identification of a color from a fandeck that will suffice, each of which may be readily and easily employed by one of ordinary skill in the art of paint mixing, the colorants are simply added to the grout composition and the grout composition agitated to provide a tinted grout composition in accordance with the request.

Colorants may be added to the grout compositions manually, or advantageously may be added to the grout compositions using commercially available tinting equipment. Tint formulations to achieve a desired color are volume based, with a base unit of ⅛ of an ounce. Thus, if provided with a tint formula of 3E+3V, one of ordinary skill in the art would recognize that ⅜ of an ounce of the universal colorant having the designation "E" should be added, in combination with ⅜$^{th}$ of an ounce of the universal colorant having the designation "V" to achieve the color described by the formulation. Inasmuch as such small amounts can be difficult to measure manually, there are many commercially available tint dispensers that may either manually dispense the indicated amount, or, may do so automatically in response to color matching software, or upon the provision of the desired formula. Examples of commercially available tinting equipment include any of those available from Red Devil, Generic Systems, Chameleon, and Charles Ross & Son, as well as those available under the trade designations Banco & MidiGiant (Corob, Ulvila, Finland), Harbil® Tintmaster, Accutinter or Blendorama (Fluid Management, Wheeling, Ill.); and ColorKing (Disti-Kleen, Irvinton, N.J.)

Similarly, the grout compositions may be agitated manually or by using any known means of agitation, including magnetic plates, rotary stirring means, such as blending or mixing bars, capable of achieving the stable uniform tinting of the grout composition. Advantageously, a sufficient amount of shear thinning has been found to be provided to the present inventive grout compositions to achieve uniform dispersion by agitating the grout compositions on any of the many commercially available paint shakers. Typically, such shakers may be sized for one or more containers, of one or more sizes, and are readily and easily operated by those of ordinary skill in the art, often only requiring insertion of the container and the push of a button to start the agitation motion. As supplied, these shakers often provide time guidelines depending on the type and/or size of the product, e.g., a 5 gallon bucket of latex paint may have a different recommended mixing time than a 1 gallon pail of latex paint, which may also have a different recommended mixing time than a 5 gallon pail of stucco. Suppliers of tinting equipment typically may also supply commercially sized mixers, and any of these, or any other commercially available shaker, is/are suitable to agitate the present tintable grout compositions. For example, several such mixers are commercially available from Fluid Management, Inc., under the tradenames Harbil® 5G, Harbil® High Speed EZ Load, Miller GyroMixer and ProMix.

Although, as mentioned above, it is possible to arrive at tinting formulations using visual or computerized color matching, the present invention yet contemplates the convenience that could be provided by avoiding such steps, as could be achieved by providing a fandeck of color formulations suitable to tint the present invention grout compositions. As opposed to visual or computerized color matching, wherein at least a minimal amount of trial and error may often be required to arrive at an acceptable color, the provision of such a fandeck would ensure that, by utilizing the provided tint formula, the color selected from the fandeck would be provided to the grout compositions. The present invention thus also contemplates a kit for providing a tinted grout composition upon request, comprising a tintable one-part polymer grout composition according to the present invention, as well as instructions for tinting the same. Desirably and advantageously, the instructions could include a fandeck of colors based upon one or more commercially available universal colorant systems, so that wherever the tintable grout compositions was purchased, it is likely that the purchaser would have several ready formulated color choices to select from. Or, a plurality of universal colorants may also be included within the kit, and at least one fandeck of colors provided based upon the same.

The following test procedures are suitable for use in the following examples:

Tint dispersion will be measured by using a Spectraflash® 600 Plus spectrophotometer. More specifically, six measurements will be taken with each tinted grout sample with the maximum difference between any two readings reported (a dE value of 0 indicates no difference in color throughout a sample). A grout composition that attains a tint dispersion of 1.5 or 1.0, or even about 0.5, will be considered to be substantially uniformly tinted as that phrase is used herein.

Tint stability will be measured by visually inspecting the tinted grout separation of the tints from the grout matrix, after oven accelerated aging. A grout will be considered to exhibit tint stability if no visible separation of the tint from the grout composition occurs for a time period of at least about 4 weeks, when the tinted grout composition is subjected to accelerated aging temperatures i.e. a temperature of at least about 50° C.

Shrinkage/Crack resistance will be measured by applying the grout compositions to joint spaces up to ¼" wide, allowing the grout to dry and recording any visually apparent cracks or sinking at joint intersections that occur(s).

Water resistance will be tested by immersing a 1 in diameter disk, ¼" thick of dried grout in water and visually monitoring the impact of the water immersion at regular time intervals. Sample may also be tested for hardness or strength after the period of immersion. Water resistance may also be measured and evaluated according to the American National Standard Specifications for standard and polymer modified cement grouts, ANSI A118.6 and A118.7.

Stain Resistance will be measured and evaluated according to the Ceramic Tile Institute Stain Test CTI-T-72, but modified to include additional staining materials (beyond what is specified in the procedure). Grout compositions scoring an average of 2 or lower are considered stain resistant according to this method.

Tensile Strength will be measured and evaluated according to the American National Standard Specifications for standard and polymer modified cement grouts, ANSI A118.6 and A118.7, using a ¼" dog bone sample rather than the specified sample size.

Flexural Strength will be measured and evaluated according to the American National Standard Specifications for standard and polymer modified cement grouts, ANSI A118.6 and A118.7, using a ¼×¼" bar sized sample rather than the specified sample size.

Installation performance was measured and rated according to ASTM Method C 627-76 Evaluating Ceramic Floor Tile Installation Systems.

Shore A hardness was measured using a Shore A durameter. If the indenter completely penetrates the sample, a reading of 0 is obtained, and if no penetration occurs, a reading of 100 results. Samples capable of achieving an average Shore A hardness reading of at least about 50, or at least about 60, or even at least about 75 after being submerged in water for 7 days, are considered to be "water resistant" as that term is used herein.

EXAMPLE 1

A sanded grout composition embodying certain aspects of the present invention was prepared according to the following Formula I by adding the components, in the order and amounts listed, to an appropriate mixing container:

Formula I

| Component | Amount (g) |
|---|---|
| Water | 24.6 |
| T-DET ® N-407 (surfactant) | 8.5 |
| Ethylene glycol | 19 |
| Colloid 211 (dispersant) | 2.5 |
| Triethanolamine | 3.3 |
| Rhoximat ® DS 931 (silanated styrene acrylic latex) | 190 |
| Mineral Spirits | 10 |
| Wollastocoat ® treated Nyad ® G (surface modified wollastonite fiber) | 49.8 |
| Arbocel ® B400 (cellulose fiber) | 6.0 |
| Lapinus MS605Roxul1000 (Rock wool fiber) | 30.0 |
| Atomite ® (calcium carbonate) | 227.8 |
| Tylose ® H2OP2 (cellulose) | 2 |
| Troysan ® 174 (bactericide) | 2 |
| Troysan ® P20T (fungicide) | 0.5 |
| NXZ (defoamer) | 1.5 |
| Scotchlite ® S60/10000 (glass filler) | 36.5 |
| Sokalan ® CP135 (dispersant) | 5 |
| Water | 5.4 |
| Silane A1106 (adhesion promoter) | 2 |
| NXZ | 2 |
| Wedron ® 720 (sand) | 206.1 |
| F-55 (sand) | 157.5 |
| NXZ | 1.5 |
| Water | 6.5 |
| Total | 1000.00 |

The above components were added to a container in the order recited and mixed after each addition with a KitchenAid mixer for at least one minute, with the exception that after the addition of the fibers (Wollastocoat®, Arbocel® and Lapinus), the mixture was mixed for at least about 5 minutes.

The resulting grout composition was stably and uniformly tinted, as described below in Comparative Example 1 and had a measured viscosity of 700,000. Surprisingly and advantageously, this embodiment of the inventive grout composition also met the water absorption, tensile strength, and flexural strength property requirements for standard cement grout. More particularly, this particular grout composition had the following properties as measured by ANSI118.6:

| Property | Requirement for standard cement grout | Measured property of polymer grout according to formula I |
|---|---|---|
| Water absorption | | |
| 50% humidity to immersion | <10% | 6.9% |
| Immersion to dry | <12% | 3.1% |
| Tensile Strength (28 days) | 350 psi minimum | 543.8 psi |
| Flexural Strength (7 days) | 350 psi minimum | 419.6 |
| Stain resistance | No requirement, typical cement grouts average 4.5-5 | Average <2 |

This particular grout composition also showed no visible shrinkage or cracking when applied to ¼" joint spaces. The grout composition was also determined to be stain resistant, scoring an average rating of <2 on the Ceramic Tile Institute Stain Test CTI-T-72. Finally, this grout achieved an installation performance rating of "Residential" according to ASTM C 627-76.

EXAMPLE 2

A sanded grout composition embodying certain aspects of the present invention was prepared according to the following Formula II by adding the components, in the order and amounts listed, to an appropriate mixing container:

Formula II

| Component | Amount (g) |
|---|---|
| Water | 24.6 |
| T-DET ® N-407 (surfactant) | 8.5 |
| Ethylene glycol | 19 |
| Colloid 211 (dispersant) | 2.5 |
| Triethanolamine | 3.3 |
| Rhoximat ® DS 931 (latex) | 190 |
| Mineral Spirits | 10 |
| Wollastocoat ® treated Nyad ® G (surface modified wollastonite fiber) | 49.8 |
| Arbocel ® B400 (cellulose fiber) | 6.0 |
| Lapinus MS605Roxul1000 (Rock wool fiber) | 30.0 |
| Zinc oxide | 213.4 |
| Tylose ® H2OP2 (cellulose) | 2 |
| Troysan ® 174 (bactericide) | 2 |
| Troysan ® P20T (fungicide) | 0.5 |
| NXZ (defoamer) | 1.5 |
| Scotchlite ® S60/10000 (glass filler) | 36.5 |
| Sokalan ® CP135 (dispersant) | 5 |
| Water | 5.4 |
| Silane A1106 (adhesion promoter) | 2 |
| NXZ | 2 |
| Wedron ® 720 (sand) | 206.1 |
| F-55 (sand) | 157.5 |
| PT 5700 (titanium dioxide) | 14.4 |
| NXZ | 1.5 |
| Water | 6.5 |
| Total | 1000.00 |

The above components were added to a container in the order recited and mixed after each addition with a KitchenAid mixer for at least one minute, with the exception that after the addition of the fibers, (Wollastocoat®, Arbocel® and Lapinus), the mixture was mixed for at least about 5 minutes.

The resulting grout composition had a measured viscosity of 625,000 cps and is expected to be capable of being stably and uniformly tinted according to the method of the present invention, and may further meet the water absorption, tensile strength, and flexural strength property requirements for standard cement grout.

EXAMPLE 3

An unsanded grout composition embodying certain aspects of the present invention was prepared according to the following Formula III by adding the components, in the order and amounts listed, to an appropriate mixing container:

Formula III

| Component | Amount (g) |
|---|---|
| Water | 7.5 |
| T-DET ® N-407 (surfactant) | 6 |
| Ethylene glycol | 17 |
| Colloid 211 (dispersant) | 2.5 |
| Triethanolamine | 3 |
| Water | 13 |
| Rhoximat ® DS 931 (latex) | 300 |
| Mineral Spirits | 30 |
| Lapinus MS605Roxul1000 (Rock wool fiber) | 30 |
| FIC200 (cellulose fiber) | 20 |
| Atomite ® (calcium carbonate filler) | 430 |
| Tylose ® H2OP2 (cellulose) | 2 |
| Water | 24 |
| Silane A1106 (adhesion promoter) | 2 |
| Troysan ® 174 (bactericide) | 2 |
| Troysan ®P20T (fungicide) | 0.5 |
| NXZ (defoamer) | 1.5 |
| Scotchlite ® S60/10000 (glass filler) | 36.5 |
| Sokalan ® CP135 (dispersant) | 5 |
| Water | 5.4 |
| PT 5700 (titanium dioxide) | 10 |
| Scotchlite ® S60/10000 | 87.5 |
| NXZ | 3 |
| Water (optional) | 10 |
| Total | 1000.00 |

The above components were added to a container in the order recited and mixed after each addition with a KitchenAid mixer for at least one minute, with the exception that, after the addition of the fibers (Arbocel® and Lapinus), the mixture was mixed for at least about 5 minutes.

The resulting unsanded grout composition is expected to have a measured viscosity of 100,000 cps, and to be stably and uniformly tintable by the method of the present invention.

COMPARATIVE EXAMPLE 1

The grout composition according to Formula I was tested for uniform and stable tintability along side of six commercially available one-part polymer grout compositions: Custom unsanded (Custom Building Products, Seal Beach, Calif.); Ace unsanded one part polymer grout (Ace Hardware Stores, nationwide); TilePerfect, both sanded and unsanded (TilePerfect, Aurora, Ill.); and Mapei sanded and unsanded (Mapei, Deerfield, Fla.).

More specifically, each of the samples were tinted with DeGussa Colortrend 888 tints according to the formulations 3E+3V ($3/48^{th}$ oz phthalo blue and $3/48^{th}$ oz magenta to provide purple); 3T+3R ($3/48^{th}$ oz medium yellow and $3/48^{th}$ oz organic red to provide orange) and 2D+6E+2T ($2/48^{th}$ oz phthalo green, $6/48^{th}$ oz phthalo blue and $2/48^{th}$ oz medium yellow to provide blue/green). Tints were dispensed with a 22PD automatically dispensing tint dispenser (Fluid Management, Inc.), and the tinted grout agitated utilizing either a Miller Model G paint shaker, or a Harbil 5G HD, depending on the type of container. That is, the Miller paint shaker is suitable for metal cans, whereas the Harbil can accept only plastic containers. All samples were shaken for 3 minutes, turned over and shaken for another 3 minutes.

The samples were then tested for color dispersion and tint stability, as described above. The results are provided in the tables below.

Color Dispersion

| Sample | Orange | Purple | Green |
|---|---|---|---|
| Formula I, above | 0.05 | 0.19 | 0.29 |
| Custom (unsanded) | 0.05 | 0.13 | 1.66 |
| Ace (unsanded) | 0.12 | 0.28 | 6.67 |
| TilePerfect(unsanded) | 2.87 | 5.77 | 4.65 |
| TilePerfect (sanded) | 2.83 | 3.56 | 16.95 |
| Mapei (unsanded) | 3.66 | 12.12 | 11.48 |
| Mapei (sanded) | 3.97 | 7.42 | 4.52 |
| TA 680 Colorlastec | 0.11 | 0.06 | 0.12 |

Tint Stability

| Sample | Orange | Purple | Green |
|---|---|---|---|
| Formula I, above | No visible separation | No visible separation | No visible separation |
| Custom (unsanded) | Visible separation of tints on the surface | Visible separation of tints on the surface | Visible separation of tints on the surface |
| Ace (unsanded) | Visible separation of tints on the surface | Visible separation of tints on the surface | Visible separation of tints on the surface |
| TilePerfect(unsanded) | Visible separation of tints on the surface | Visible separation of tints on the surface | Visible separation of tints on the surface |
| TilePerfect (sanded) | No visible separation | No visible separation | No visible separation |
| Mapei (unsanded) | No visible separation | No visible separation | No visible separation |
| Mapei (sanded) | No visible separation | No visible separation | No visible separation |
| TA 680 Colorlastec | No visible separation | No visible separation | No visible separation |

Additionally, the Formula I grout composition and the six competitive samples were tested for shrinkage/crack resistance by applying the grout compositions to joint spaces up to ¼" wide, allowing the grout to dry and recording any visually apparent cracks or sinking at joint intersections that occur(s). The results of this testing are provided below. Generally speaking, none of the six commercially available products are capable of being applied in joint spaces larger than ⅛" of without shrinkage or cracking.

Shrinkage/Crack Resistance

| Sample | ⅛" joints | 3/16" joints |
|---|---|---|
| Formula I, above | No visible shrinking/cracking | No visible shrinking or cracking |
| Custom (unsanded) | Visible shrinking, cracking and pinhole formation | Visible shrinking, cracking and pinhole formation |
| Ace (unsanded) | Visible shrinking, cracking and pinhole formation | Visible shrinking, cracking and pinhole formation |
| TilePerfect (unsanded) | Pinholes | Significant shrinkage |
| TilePerfect (sanded) | Pinholes | Significant shrinkage |
| Mapei (unsanded) | Pinholes | Visible shrinkage and cracking |
| Mapei (sanded) | Pinholes | Visible shrinkage and cracking |
| TA 680 Colorlastec | Pinholes | Visible shrinkage and cracking |

As is shown, only the grout composition according to formula I and TA 680 Colorlastec (no longer commercially available from HBFuller) could be both uniformly and stably tinted. However, only the grout composition of Formula I is also shrinkage/crack resistant as defined herein.

COMPARATIVE EXAMPLE 2

The grout compositions according to Formulas I and II, above, were tested according to ANSI 118.6 for water absorption, along side of three commercially available one-part grout compositions, Premix Ceramic Tile Adhesive and Grout, sanded and unsanded, commercially available from Tile Perfect, Aurora, Ill. and Custom Pre-Mixed Tile Grout, commercially available from Custom Building Products, Seal Beach, Calif. Two samples of each grout composition were tested. The results of this comparison are provided below in Table 3

| Sample | Cure to Immersion | Immersion to Dry |
|---|---|---|
| Standard sanded cement grout requirement | <10% | <12% |
| Standard unsanded cement grout, requirement | <18% | <20% |
| Formula I, sample A | 5.1% | 5.24% |
| Formula I, sample B | 5.11% | 5.27% |
| Formula II, sample A | 3.42% | 4.97% |
| Formula II, sample B | 3.38% | 4.93% |
| Tile Perfect, unsanded, sample A | 22.19% | 13.48% |
| Tile Perfect, unsanded, sample B | 22.6% | 14.41% |
| Tile Perfect, sanded, sample A | 7.66% | 5.35% |
| Tile Perfect, sanded, sample B | 7.51% | 5.18% |
| Custom, sample A | 12.59% | 13.01% |
| Custom, sample B | 13.27% | 13.71% |

As can be seen, two of the commercially available one-part polymer grouts, although not unexpectedly, did not meet the ANSI requirement for standard sanded cement grout, and none performed as well as exemplified grout compositions according to Formulas I and II. Additionally, sample disks 1" diameter and ¼" thick were prepared of each sample and were soaked in water for 10 days. Formula I and Formula II samples were still hard, having Shore A hardness values ranging from 50 to about 100 while competitive products were soft, have a Shore A reading of 0. In fact, the Tile Perfect samples had a Shore A reading of 0 even prior to being submerged in water.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A shrink resistant one-part polymer grout composition comprising an amount of at least two fiber fillers and tintable at a point of sale to provide a stable, uniformly tinted, grout composition.

2. The shrink resistant grout composition of claim 1, wherein upon tinting, the grout composition attains a color dispersion of less than at least about 0.5 and substantially maintains this color dispersion for a period of at least about 2 weeks.

3. The shrink resistant grout composition of claim 2, wherein the grout composition maintains the color dispersion for at least about 28 days.

4. The shrink resistant grout composition of claim 1, wherein the at least two fiber fillers comprise mineral fibers and cellulose fibers.

5. The shrink resistant grout composition of claim 1, comprising a silanated polymer.

6. The shrink resistant grout composition of claim 5, wherein the silanated polymer is a silanated acrylic.

7. A method of providing a tinted one-part polymer grout composition upon request comprising:
 a) providing a one-part polymer grout composition comprising an amount of at least two fiber fillers;
 b) adding one or more universal colorants to the grout composition capable of providing the requested tint;
 c) agitating the grout composition;
 thereby providing the requested tinted grout composition.

8. The method of claim 7, wherein the universal colorants are added to the grout composition using manually dispensing tinting equipment.

9. The method of claim 7, wherein the universal colorants are added to the grout compositions using automatically dispensing tinting equipment.

10. The method of claim 7, wherein the universal colorants are added to the grout composition according to a color formula provided in a color fandeck.

11. The method of claim 7, wherein the universal colorants are added to the grout composition according to a color formula provided by color matching software.

12. A kit for providing a tinted grout composition comprising;

a shrink resistant tintable one-part polymer grout composition comprising an amount of at least two fiber fillers and tintable at a point of sale to provide a stable, uniformly tinted, grout composition; and instructions for adding one or more universal colorants to the tintable grout composition to provide a tinted grout composition.

13. The kit of claim 12, wherein the instructions comprise at least one fandeck of color formulations associated with the universal colorants.

14. The kit of claim 12, further comprising a plurality of universal colorants.

* * * * *